US008444070B2

(12) United States Patent
El-Beshbeesy et al.

(10) Patent No.: US 8,444,070 B2
(45) Date of Patent: May 21, 2013

(54) ELECTRIC-ACTUATED CONTROL VALVE OF A UNIT FUEL INJECTOR

(75) Inventors: Mahmoud S. El-Beshbeesy, Mount Prospect, IL (US); Grzegorz Siuchta, Des Plaines, IL (US); Rakesh Malhotra, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 356 days.

(21) Appl. No.: 13/010,980

(22) Filed: Jan. 21, 2011

(65) Prior Publication Data

US 2012/0186558 A1 Jul. 26, 2012

(51) Int. Cl.

| | |
|---|---|
| ***F02M 51/06*** | (2006.01) |
| ***F02M 61/04*** | (2006.01) |
| ***F02M 61/10*** | (2006.01) |
| ***F02M 47/04*** | (2006.01) |
| ***F02M 47/02*** | (2006.01) |
| ***F16K 31/08*** | (2006.01) |

(52) U.S. Cl.

USPC ......... 239/585.1; 239/88; 239/533.2; 251/65; 251/129.1

(58) Field of Classification Search

USPC .................... 239/88, 96, 533.2, 533.8, 533.9, 239/533.11, 584, 585.1–585.5; 251/65, 129.1; 123/472, 473

See application file for complete search history.

(56) References Cited

U.S. PATENT DOCUMENTS

| | | | | |
|---|---|---|---|---|
| 4,690,371 | A * | 9/1987 | Bosley et al. | 251/65 |
| 5,460,329 | A * | 10/1995 | Sturman | 239/96 |
| 5,479,901 | A * | 1/1996 | Gibson et al. | 123/472 |
| 5,954,030 | A * | 9/1999 | Sturman et al. | 123/446 |
| 5,964,406 | A * | 10/1999 | Zuo | 239/88 |
| 5,992,821 | A * | 11/1999 | Rookes et al. | 251/129.1 |
| 6,085,991 | A * | 7/2000 | Sturman | 239/88 |
| 6,257,499 | B1 * | 7/2001 | Sturman | 239/96 |
| 6,745,958 | B2 * | 6/2004 | Lei | 239/585.2 |
| 6,769,405 | B2 * | 8/2004 | Leman et al. | 123/446 |
| 6,845,926 | B2 * | 1/2005 | Lei | 239/533.2 |
| 2002/0029765 | A1 * | 3/2002 | Giavi et al. | 123/490 |
| 2004/0103866 | A1 * | 6/2004 | Shafer et al. | 123/90.11 |

* cited by examiner

*Primary Examiner* — Darren W Gorman

(74) *Attorney, Agent, or Firm* — Mark C. Bach; Jeffrey P. Calfa

(57) ABSTRACT

A unit fuel injector (10) has a control valve (40) in which a valve spool (92) is displaceable within a bore (91) of a valve body (90) between a limit of displacement that fully opens an oil outlet port (42) to an oil inlet port (44) while closing an oil drain port (106) to the oil outlet port and a limit of displacement that closes the oil outlet port to the oil inlet port while opening the oil outlet port to the oil drain port. The valve spool has a spool body (96) whose geometry defines an exterior envelope of the valve spool. Permanent magnets (98, 100) are disposed within a bore of the spool body inside of the exterior envelope, and electromagnets (102, 104) are electromagnetically coupled with the permanent magnets for displacing the valve spool within the valve body bore.

10 Claims, 2 Drawing Sheets

ELECTRIC-ACTUATED CONTROL VALVE OF A UNIT FUEL INJECTOR

TECHNICAL FIELD

This disclosure relates generally to internal combustion engines having cylinders into which fuel is injected, and in particular it relates to a unit injector for direct high-pressure injection of diesel fuel into an engine cylinder.

BACKGROUND OF THE DISCLOSURE

A known electronic engine control system comprises a processor-based engine controller that processes data from various sources to develop control data for controlling certain functions of the engine, including fueling of the engine by unit fuel injectors that inject fuel directly into engine cylinders. One type of unit fuel injector is commonly known as a HEUI injector, the four-letter acronym standing for hydraulically-actuated, electrically-controlled unit injector.

A HEUI injector has a fuel inlet port communicated to a source of fuel under pressure, such as pressurized fuel in a fuel rail. It also has an oil inlet port communicated to a source of hydraulic fluid under pressure, such as pressurized oil in an oil rail. Fuel is injected out of the injector and into an engine cylinder through orifices in the tip end of a nozzle disposed within the head end of the engine cylinder.

Injection of fuel is controlled by an electric-actuated control valve that when actuated open allows oil from the oil rail to pass through the oil inlet port to an oil outlet port for applying hydraulic force to a piston that is disposed at one end of a plunger. The piston transmits the hydraulic force to the plunger, and because the plunger has a smaller diameter than the piston, the pressure that the plunger applies to fuel that has entered from the fuel rail is intensified. The intensified pressure acts on certain movable elements within the fuel injector.

One such movable element is a fuel inlet check; another is a reverse flow check.

When the control valve is actuated open, the intensified pressure applied by the plunger to fuel that has entered by passing through the fuel inlet port and into a bore within which the plunger is guided forces the fuel inlet check to close the fuel inlet port so that the fuel cannot backflow out through the fuel inlet port. The intensified pressure also forces open the reverse flow check to enable the intensified pressure to unseat a spring-biased needle from an internal seat in the nozzle. The unseating of the needle against an opposing force of a needle bias spring opens a high-pressure injection path from the plunger to the nozzle orifices to force fuel through that path and be injected out of the orifices and into an engine cylinder as the plunger is forced to extend through the bore by the that oil passes through the control valve.

When the control valve is actuated closed, the flow of oil stops, greatly attenuating the pressure that the plunger was applying to the fuel. A return spring that was being compressed as the piston and plunger were extending to force the fuel injection now forces the piston and plunger to retract. This causes the needle bias spring to re-seat the needle and thereby terminate the fuel injection. The reverse flow check closes to keep some pressure in fuel between it and the nozzle, and the fuel inlet check opens to allow fuel to enter and refill the fuel injector as the plunger retracts.

Performance of the fuel injector is dependent upon various factors, one of which is the speed at which the actuator can open and close the oil inlet port.

SUMMARY OF THE DISCLOSURE

The ability of a unit fuel injector to inject fuel at increasingly higher pressures with greater precision can have favorable implications for quality of combustion and engine performance.

The present disclosure relates to a unit fuel injector whose control valve can provide greater fuel delivery control precision.

A general aspect of the disclosure relates to a unit fuel injector comprising a plunger operable within a bore along an imaginary longitudinal axis to force an injection of fuel from the unit injector, a source of pressurized oil, and a control valve for opening the source of pressurized oil to the bore to cause the plunger to force a fuel injection and for closing the source of pressurized oil to the bore to terminate a fuel injection.

The control valve comprises a valve body having an oil inlet port open to the source of pressurized oil, an oil outlet port open to the bore, an oil drain port, and a valve spool that is displaceable within a bore of the valve body between a limit of displacement that fully opens the oil outlet port to the oil inlet port while closing the oil drain port to the oil outlet port and a limit of displacement that closes the oil outlet port to the oil inlet port while opening the oil outlet port to the oil drain port.

The valve spool comprises a spool body having a geometry that defines an exterior envelope of the valve spool and a bore extending through the spool body parallel with the valve body bore. The valve spool further comprises at least one permanent magnet disposed within the spool body bore inside of the exterior envelope of the valve spool. The control valve comprising at least one electromagnet electromagnetically coupled with the at least one permanent magnet for displacing the valve spool within the valve body bore.

Another general aspect of the disclosure relates to the control valve as described.

The foregoing summary, accompanied by further detail of the disclosure, will be presented in the Detailed Description below with reference to the following drawings that are part of this disclosure.

DETAILED DESCRIPTION

Figure 1:
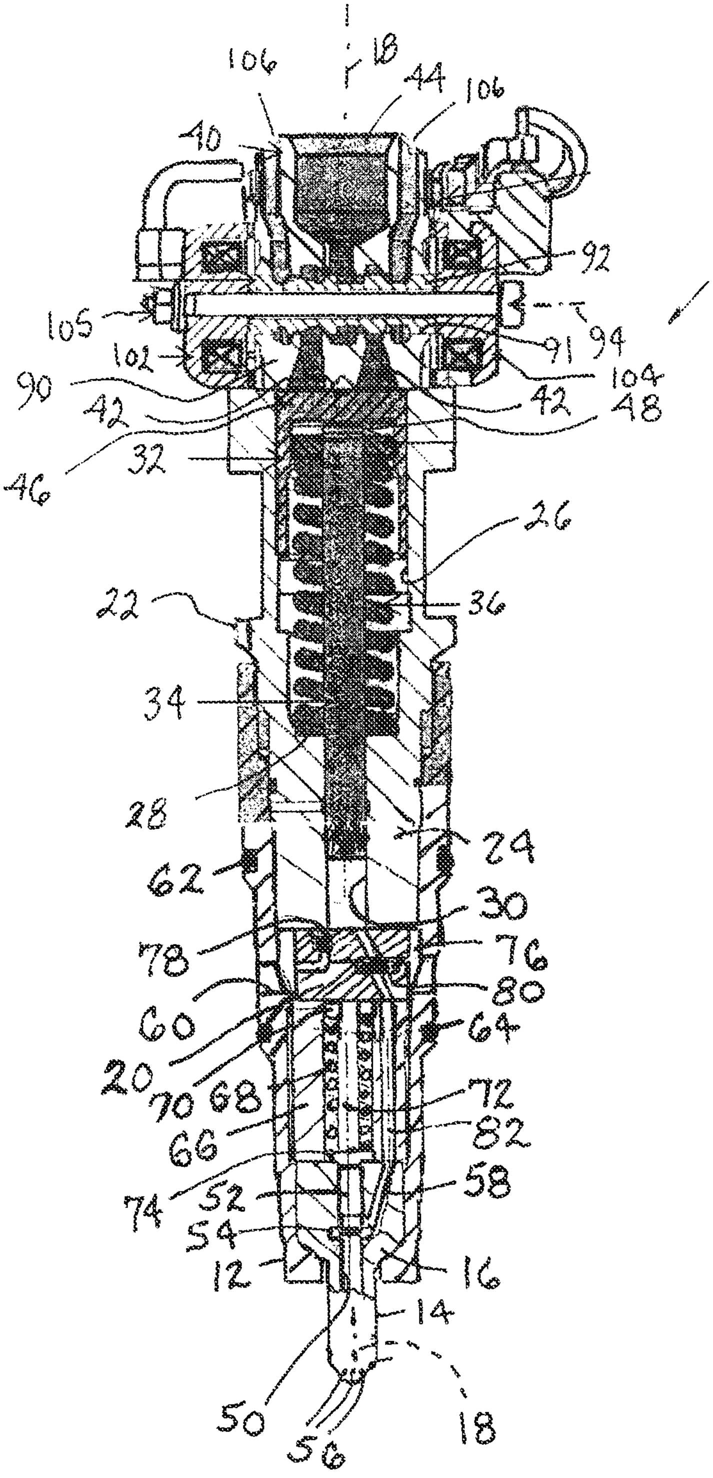
FIG. 1 is an elevation view of a fuel injector in cross section.

FIG. 1 shows a fuel injector 10 that is representative of a HEUI fuel injector. Fuel injector 10 comprises a generally cylindrical main body 12 that mounts on a cylinder head of an engine (not shown) to dispose a tip end 14 of a nozzle 16 in the head end of a cylinder bore within which a piston coupled by a piston rod to a crankshaft reciprocates. Fuel injector 10 is intended for use with a diesel engine to inject diesel fuel directly into the cylinder where the fuel combusts in air that has been compressed by the piston to create pressure that forces the piston to downstroke and impart torque to the crankshaft through the piston rod.

Main body 12 has an imaginary longitudinal axis 18 and an interior that is open at both an axially proximal end and an axially distal end. A larger diameter portion of nozzle 16 is disposed within the interior of main body 12 to close the main body's open distal end by abutment of an outer shoulder of nozzle 16 with an inner shoulder of main body 12 while a smaller diameter portion of nozzle 16 that includes tip end 14 protrudes distally out of main body 12.

Fuel injector 10 further comprises two circular disks that are in mutual abutment to cooperatively form a check valve body 20 that is disposed within the interior of main body 12 coaxial with axis 18. An intensifier cartridge 22 comprises a generally cylindrical cartridge body 24 that closes the open proximal end of main body 12.

Cartridge body 24 has a flat distal end face that is disposed within the interior of main body 12 against a proximal end face of check valve body 20. Cartridge body 24 comprises a through-bore that is coaxial with axis 18 and that comprises a larger diameter circular bore portion 26 extending from the proximal end face of cartridge body 24 to a shoulder 28 and a smaller diameter circular bore portion 30 extending from shoulder 28 to the distal end face of cartridge body 24. Intensifier cartridge 22 further comprises a piston 32, a plunger 34, and a return spring 36 that acts to bias piston 32 and plunger 34 proximally of axis 18.

Mounted at a proximal end of cartridge body 24 is an electric-actuated control valve 40 which has an outlet port 42 that opens to bore portion 26 and an inlet port 44 that is in communication with oil under pressure in an oil rail (not shown) when fuel injector 10 is installed on an engine.

Piston 32 comprises a circular head 46 and a skirt that extends distally from head 46 to guide piston 32 for displacement within bore portion 26.

Plunger 34 has a circular cylindrical shape of smaller diameter than that of piston 32. Plunger 34 extends distally of the interior of head 46 and has a close sliding fit within circular bore portion 30.

Shoulder 28 provides support for a bearing at the distal end of return spring 36. The proximal end of return spring 36 bears against a head 48 of plunger 34 that in turn bears against piston head 46 without plunger head 48 attaching to piston head 46.

Nozzle 16 comprises a central needle guide bore 50 that is coaxial with axis 18 and that extends distally from a flat proximal end face to tip end 14. A needle 52 is guided by needle guide bore 50 for displacement along axis 18. An intermediate portion of needle guide bore 50 contains a needle feed cavity 54.

Within the interior of tip end 14, a tapering surface provides a needle seat. The needle seat is a proximal boundary of a SAC volume that is below the needle seat when needle 52 is seated on the needle seat. A series of orifices 56 are distributed circumferentially around tip end 14, extending through the nozzle wall from the SAC volume to the nozzle exterior. Nozzle 16 also comprises a slant passage 58 that extends from its flat proximal end face to needle feed cavity 54. Radial clearance exists between needle 52 and needle guide bore 50 for fuel to pass from needle feed cavity 54 along the needle's length to the needle seat.

Fuel injector 30 is one of several like it that are mounted in an engine cylinder head. Fuel under pressure in a fuel supply system (not shown) serving all fuel injectors can enter main body 12 through holes 60 that form a fuel inlet port of fuel injector 10. Holes 60 are located axially between a proximal circular groove 62 and a distal circular groove 64 that extend around the outside of main body 12 and that contain O-ring seals for sealing an exterior zone of main body 12 that is exposed to fuel in the fuel supply system.

The distal end face of a cylindrical spring cage 66 is disposed against the proximal end face of the larger diameter portion of nozzle 16. Spring cage 66 comprises an interior that is open at both proximal and distal ends and that houses a bias spring 68 for biasing needle 52 to seat on the needle seat inside tip end 14. A proximal end of bias spring 68 bears against an annular shim 70 that in turn bears against the central region of the distal end face of check valve body 20. The proximal end of a needle lift pin 72 passes with clearance through the open centers of shim 70 and bias spring 68. Needle lift pin 72 has a length that is less than the axial distance between the distal end face of check valve body 20 and a proximal end face of needle 52 when the needle is seated on the needle seat for limiting needle lift off the needle seat. A distal end of bias spring 68 bears against the outer margin of a flat proximal face of a circular disk 74 to force a flat end surface of a distally raised boss at the center of a distal face of disk 74 against the flat proximal end of needle 52.

A fuel space 76 inside main body 12 is open to holes 60. Main body 12 and cartridge body 24 are tightly fastened together to axially capture check valve body 20, spring cage 66, and the larger diameter portion of nozzle 16 inside main body 12.

A fuel inlet check 78 (a ball) is disposed in an inlet fuel passage extending through check valve body 20 from fuel space 76 to smaller diameter bore portion 30, and a reverse flow check 80 (a disk) is disposed in an outlet fuel passage through check valve body 20 from smaller diameter bore portion 30 to a passage 82 extending through spring cage 66 parallel to axis 18 to meet an entrance of slant passage 58 in nozzle 16. The outlet fuel passage through check valve body 20, passage 82, slant passage 58, needle feed cavity 54, and the portion of needle guide bore 50 from needle feed cavity 54 to orifices 56 form a high-pressure injection path for plunger 34 to force fuel out of orifices 56.

When control valve 40 is actuated open, oil passes through to apply hydraulic force to head 46 of piston 32. Piston 32 transmits the hydraulic force to the smaller diameter plunger 34, which applies intensified pressure to fuel that has entered bore portion 30 from the fuel rail. The intensified pressure acts to close fuel inlet check 78 so that the fuel cannot backflow out through holes 60 and to open reverse flow check 80 so that the intensified pressure unseats needle 52 from the needle seat in nozzle 16, thereby opening the high-pressure injection path to orifices 56. Because of the geometry of needle 52, the fuel pressure acts on the needle with a proximally directed force component that overcomes the distally directed force of bias spring 68, resulting in unseating of needle 52. Continued displacement of plunger 34 forces fuel through the high-pressure injection path, out of orifices 56, and into an engine cylinder, compressing return spring 36 in the process.

When control valve 40 is actuated closed, the flow of oil stops, greatly attenuating the pressure that plunger 34 was applying to the fuel. Return spring 36 now forces piston 32 and plunger 34 to retract. Bias spring 68 re-seats needle 52 to terminate the fuel injection. Reverse flow check 80 closes to keep some pressure in fuel present between it and nozzle 16, and fuel inlet check 78 opens to allow fuel to enter and refill fuel injector 10.

Control valve 40 functions to control the timing of fuel injection by controlling the opening and closing of outlet port 42 to inlet port 44.

Control valve 40 comprises a valve body 90 having a bore 91 within which a valve spool 92 is disposed for limited displacement along an axis 94 that is transverse to axis 18. At one limit of valve spool displacement, outlet port 42 is fully open to inlet port 44. At an opposite limit of valve spool displacement, outlet port 42 is completely closed to inlet port 44.

Figure 2:
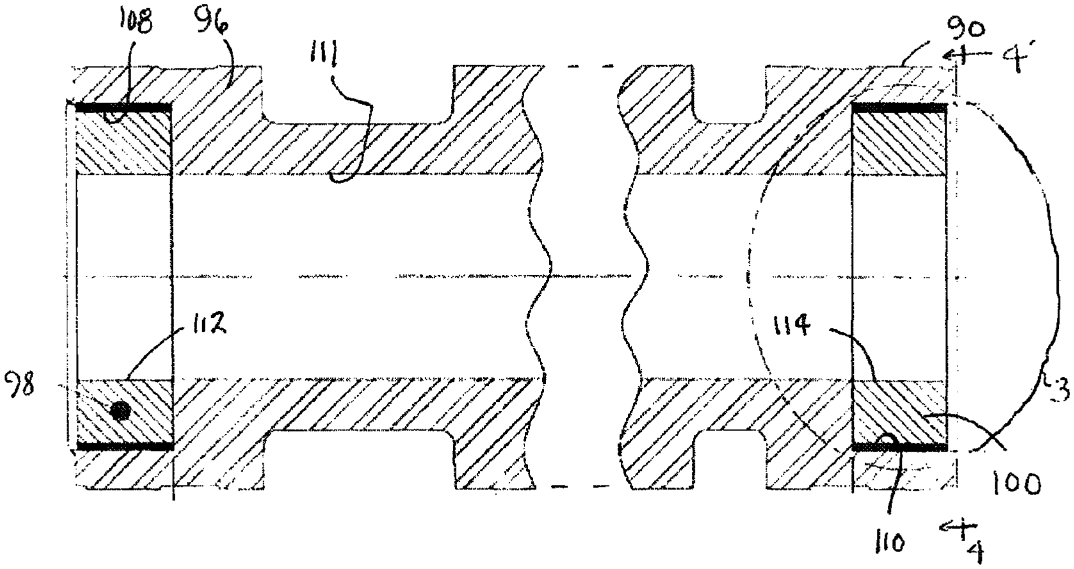
FIG. 2 is an enlarged view that shows more detail of a valve spool assembly that is present in FIG. 1.
Figure 3:
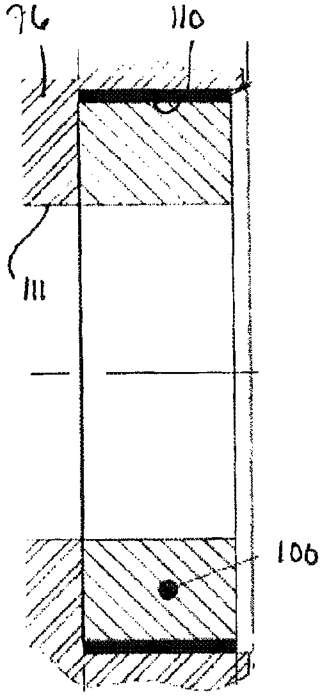
FIG. 3 is an enlarged view in oval 3 of FIG. 2.
Figure 4:
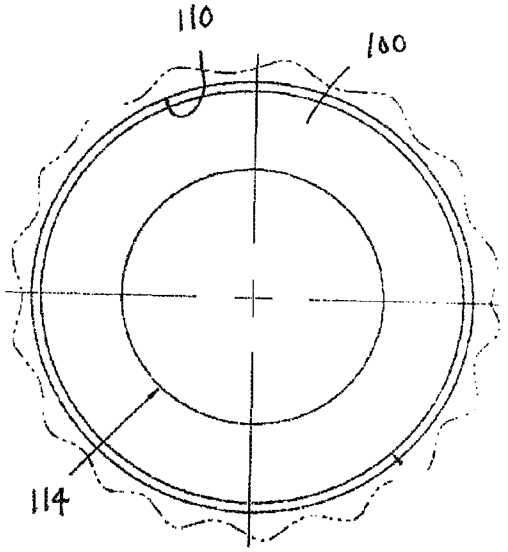
FIG. 4 is a full end view on a slightly larger scale looking in the direction of arrows 4-4 in FIG. 2.

Valve spool 92 is shown by itself in FIGS. 2-4 to comprise an assembly of several parts including a spool body 96, a permanent magnet 98, and a permanent magnet 100.

On its exterior, spool body 96 comprises several circumferential grooves that are separated by lands. Valve body bore 91 comprises grooves and lands that cooperate with the grooves and lands of spool body 96.

When valve spool 92 is at the limit of displacement that completely closes outlet port 42 to inlet port 44, certain lands present obstructions between inlet port 44 and outlet port 42. When valve spool 92 is at the limit of displacement that fully opens outlet port 42 to inlet port 44, the lands allow oil to pass from inlet port 44 to outlet port 42.

Valve spool 92 is displaced between the two limits of displacement by selective operation of an open electromagnet 102 and a close electromagnet 104 which are disposed at opposite axial ends of valve body 90 and held fast against ends of valve body 90 by a bolt and nut fastener 105. Open electromagnet 102 is electromagnetically coupled with permanent magnet 98 and a close electromagnet 104 is electromagnetically coupled with permanent magnet 100.

For operating control valve 40 from one of its limits of displacement at which outlet port 42 is closed to inlet port 44 to the other of its limits of displacement at which outlet port 42 is fully open to inlet port 44, open electromagnet 102 is energized by an electric current pulse while close electromagnet 104 is not energized.

For operating control valve 40 from the other limit of displacement at which outlet port 42 is fully open to inlet port 44 to the one limit of displacement at which outlet port 42 is closed to inlet port 44, close electromagnet 104 is energized by an electric current pulse while open electromagnet 102 is not energized. As valve spool 92 is being displaced by the energization of close electromagnet 104, certain lands begin to allow oil to pass from outlet port 42 to a drain port 106 that opens to a passage leading to an oil sump. This drain path remains open to allow piston 32 to force oil out of intensifier cartridge 22 as piston 32 and plunger 34 retract. Spool body 96 comprises a hard, wear-resistant material that provides robustness for enabling control valve 40 to continue to operate properly for the numerous repeated cycles of valve spool 92 that would be anticipated to occur during a specified useful life of fuel injector 10.

Precision in fuel injection is a function of certain factors that include how closely electromagnets 102, 104 are electromagnetically coupled with valve spool 92, response times of the electromagnets, and electromagnetic properties of valve spool 92. Permanent magnets 98, 100 comprise a permanently magnetized material such as samarium cobalt, or equivalent, having high residual magnetic flux that provides fast response when electromagnets 102, 104 are energized.

Spool body 96 comprises circular counterbores 108, 110 at opposite axial ends of a through-bore 111 that is parallel with valve body bore 91. A respective permanent magnet 98, 100 is securely disposed in a respective counterbore 108, 110, in any suitably appropriate way that may include the use of an adhesive between the diameter of the counterbore and the outside diameter of the permanent magnet. Each magnet 98, 100 has flat ends faces and a respective circular inner surface 112, 114 whose diameter is essentially identical to that of through-bore 111. The axial length of each permanent magnet 98, 100 is less than the axial length of the respective counterbore 108, 110 to which it is fit. In this way it is possible for spool body 96 to have an exterior envelope that allows valve spool 92 to be substituted for a valve spool that has the same envelope and exterior robustness but lacks the electromagnetic properties provided by permanent magnets 98, 100.

Permanent magnets 98, 100 are axially magnetized to have a South pole at the inner face that is in abutment with the respective shoulder at the inner end of the respective counterbore 108, 110 and a North pole at the outer face.

What is claimed is:

1. A unit fuel injector comprising:

a plunger operable within a bore along an imaginary longitudinal axis to force an injection of fuel from the unit injector;

a source of pressurized oil; and a control valve for opening the source of pressurized oil to the bore to cause the plunger to force a fuel injection and for closing the source of pressurized oil to the bore to terminate a fuel injection;

the control valve comprising a valve body having an oil inlet port open to the source of pressurized oil, an oil outlet port open to the bore, an oil drain port, and a valve spool that is displaceable within a bore of the valve body between a limit of displacement that fully opens the oil outlet port to the oil inlet port while closing the oil drain port to the oil outlet port and a limit of displacement that closes the oil outlet port to the oil inlet port while opening the oil outlet port to the oil drain port;

the valve spool comprising a spool body having a geometry that defines an exterior envelope of the valve spool and a bore extending through the spool body parallel with the valve body bore, the valve spool further comprising at least one permanent magnet disposed within the spool body bore inside of the exterior envelope of the valve spool; and the control valve comprising at least one electromagnet electromagnetically coupled with the at least one permanent magnet for displacing the valve spool within the valve body bore.

2. A unit injector as set forth in claim 1 in which the spool body bore comprises a through-bore.

3. A unit injector as set forth in claim 2 in which the spool body through-bore comprises respective counterbores at opposite ends thereof and the at least one permanent magnet comprises an open permanent magnet disposed within one of the counterbores and a close permanent magnet disposed within the other of the counterbores.

4. A unit injector as set forth in claim 3 in which the at least one electromagnet comprises an open electromagnet electromagnetically coupled with the open permanent magnet and a close electromagnet electromagnetically coupled with the close permanent magnet.

5. A unit injector as set forth in claim 1 in which the at least one permanent magnet comprises samarium cobalt, or equivalent.

6. A control valve for a unit fuel injector comprising:

a valve body having an oil inlet port, an oil outlet port, an oil drain port, a valve spool that is displaceable within a bore of the valve body between a limit of displacement that fully opens the oil outlet port to the oil inlet port while closing the oil drain port to the oil outlet port and a limit of displacement that closes the oil outlet port to the oil inlet port while opening the oil outlet port to the oil drain port;

the valve spool comprising a spool body having a geometry that defines an exterior envelope of the valve spool and a bore extending through the spool body parallel with the valve body bore, the valve spool further comprising at least one permanent magnet disposed within the spool body bore inside of the exterior envelope of the valve spool; and at least one electromagnet electromagnetically coupled with the at least one permanent magnet for displacing the valve spool within the valve body bore.

7. A control valve as set forth in claim 6 in which the spool body bore comprises a through-bore.

8. A control valve as set forth in claim 7 in which the spool body through-bore comprises respective counterbores at opposite ends thereof and the at least one permanent magnet comprises an open permanent magnet disposed within one of the counterbores and a close permanent magnet disposed within the other of the counterbores.

9. A control valve as set forth in claim 8 in which the at least one electromagnet comprises an open electromagnet electromagnetically coupled with the open permanent magnet and a close electromagnet electromagnetically coupled with the close permanent magnet.

10. A control valve as set forth in claim 6 in which the at least one permanent magnet comprises samarium cobalt, or equivalent.

* * * * *